US008506925B1

(12) United States Patent
No et al.

(10) Patent No.: US 8,506,925 B1
(45) Date of Patent: Aug. 13, 2013

(54) IODINE-SULFUR CYCLE FOR NUCLEAR HYDROGEN PRODUCTION WITH IMPROVED THERMO-CHEMICAL EFFICIENCY

(75) Inventors: Hee C. No, Daejeon (KR); Byung J. Lee, Daejeon (KR)

(73) Assignee: Korea Advanced Institute of Science and Technology, Yuseong-Gu, Daejeon (KR)

( * ) Notice: Subject to any disclaimer, the term of this patent is extended or adjusted under 35 U.S.C. 154(b) by 1229 days.

(21) Appl. No.: 12/404,719

(22) Filed: Mar. 16, 2009

(30) Foreign Application Priority Data

Aug. 20, 2008 (KR) ........................ 10-2008-0081299

(51) Int. Cl.
    C01B 3/04      (2006.01)
    C01B 7/13      (2006.01)
    C01B 7/14      (2006.01)

(52) U.S. Cl.
     USPC .................... 423/658.2; 423/481; 423/507

(58) Field of Classification Search
     USPC ................ 423/648.1, 658.2, 481, 488, 507
     See application file for complete search history.

(56) References Cited

U.S. PATENT DOCUMENTS

| 4,089,939 | A | * | 5/1978 | Norman et al. | 423/658.2 |
| 4,089,940 | A | * | 5/1978 | Norman et al. | 423/658.2 |
| 4,127,644 | A | * | 11/1978 | Norman et al. | 423/658.2 |
| 4,150,094 | A | * | 4/1979 | Mysels et al. | 423/481 |
| 7,442,363 | B2 | * | 10/2008 | Takahashi et al. | 423/648.1 |
| 2010/0015040 | A1 | * | 1/2010 | Kim et al. | 423/658.2 |

FOREIGN PATENT DOCUMENTS

WO    WO 2008/087252    *  7/2008

OTHER PUBLICATIONS

B. J. Lee, et al., "An Optimal Operating Window for the Bunsen Process in the I-S Thermochemical Cycle" *International Journal of Hydrogen Energy* 33: 2200-2210 (Apr. 9, 2008).

* cited by examiner

*Primary Examiner* — Wayne Langel
(74) *Attorney, Agent, or Firm* — Lucas & Mercanti, LLP (57) ABSTRACT

Disclosed herein is an iodine-sulfur cycle for nuclear hydrogen production, which can improve thermochemical efficiency. The iodine-sulfur cycle is advantageous in that the amount of excess water and iodine supplied to a Bunsen reaction process is minimized, thus minimizing the amount of thermal energy consumed in the recovery and recirculation process thereof, in that sulfuric acid having stronger hydrophilicity than hydrogen iodide absorbs excess water in large quantities in a spontaneous liquid-liquid phase separation process, so that, after the spontaneous liquid-liquid phase separation process, the concentration of hydrogen iodide in a hydrogen iodide solution exceeds a concentration at an azeotropic point without conducting an additional concentration process, with the result that highly-concentrated hydrogen iodide gas can be obtained only through a flashing process, thereby decreasing energy consumption and simplifying the process and thus improving economical efficiency, and in that process temperature and pressure can be decreased, thus greatly deceasing the corrosivity in an operational environment. Therefore, the iodine-sulfur cycle according to the present invention can be usefully used for high-efficient and environmentally-friendly nuclear hydrogen production.

18 Claims, 12 Drawing Sheets

IODINE-SULFUR CYCLE FOR NUCLEAR HYDROGEN PRODUCTION WITH IMPROVED THERMO-CHEMICAL EFFICIENCY

CROSS-REFERENCE TO RELATED APPLICATION

This patent application claims the benefit of priority under 35 U.S.C. §119 of Korean Patent Application No. 10-2008-0081299 filed on Aug. 20, 2008, the contents of which are incorporated herein by reference.

BACKGROUND OF THE INVENTION

1. Field of the Invention

The present invention relates to an iodine-sulfur cycle for nuclear hydrogen production, which can decrease the corrosivity in operational environments and improve thermo-chemical efficiency by optimizing process conditions.

2. Description of the Related Art

Recently, Kyoto Protocol for preventing global warming has come into effect and oil prices are unpredictably changing as the fossil fuels are getting exhausted, and thus hydrogen energy has been considered as an alternative energy source in order to decrease the emission of carbon dioxide and secure an economical energy source. Accordingly, many attempts to develop processes of economical hydrogen production using high-temperature nuclear energy have been made worldwide. Among the processes of producing hydrogen, an iodine-sulfur cycle is known as the most promising thermo-chemical cycle.

Figure 1:
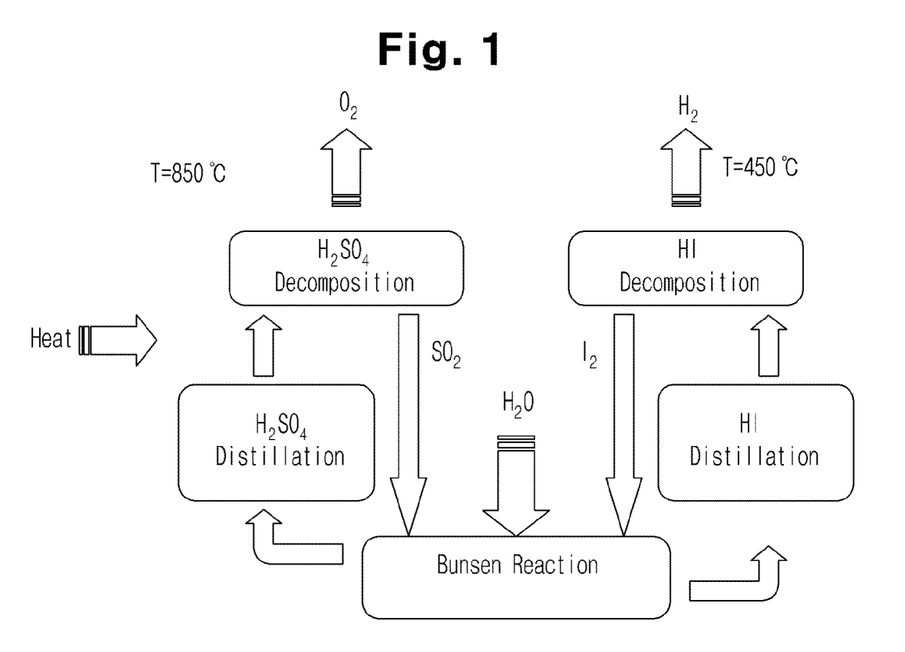
FIG. 1 is a schematic view showing major processes constituting an iodine-sulfur (I—S) cycle.

The iodine-sulfur cycle includes a Bunsen reaction process, a sulfuric acid ($H_2SO_4$) decomposition process, and a hydrogen iodide (HI) decomposition process. The basic principle of the iodine-sulfur cycle was first presented by General Atomics Co., Ltd. in U.S.A in the early 1980's (refer to FIG. 1).

According to a typical iodine-sulfur cycle, in a Bunsen reaction process, sulfur dioxide ($SO_2$) and iodine ($I_2$) dissolve in water ($H_2O$) and then react with each other at a relatively low temperature of about 120° C. to decompose water molecules and thus to produce sulfuric acid ($H_2SO_4$) and hydrogen iodide (HI) in the form of a mixture. In this case, the change in Gibbs free energy (G) between before and after the reaction must be negative in order to easily conduct the water decomposition reaction, and, for this purpose, a large amount of excess water must be added to the reactants. Subsequently, the mixture discharged from a Bunsen reactor is separated into a relatively-light sulfuric acid solution and a relatively-heavy hydrogen iodide solution through a spontaneous liquid-liquid phase separation process, and, for this purpose, a large amount of excess iodine is required.

Figure 2:
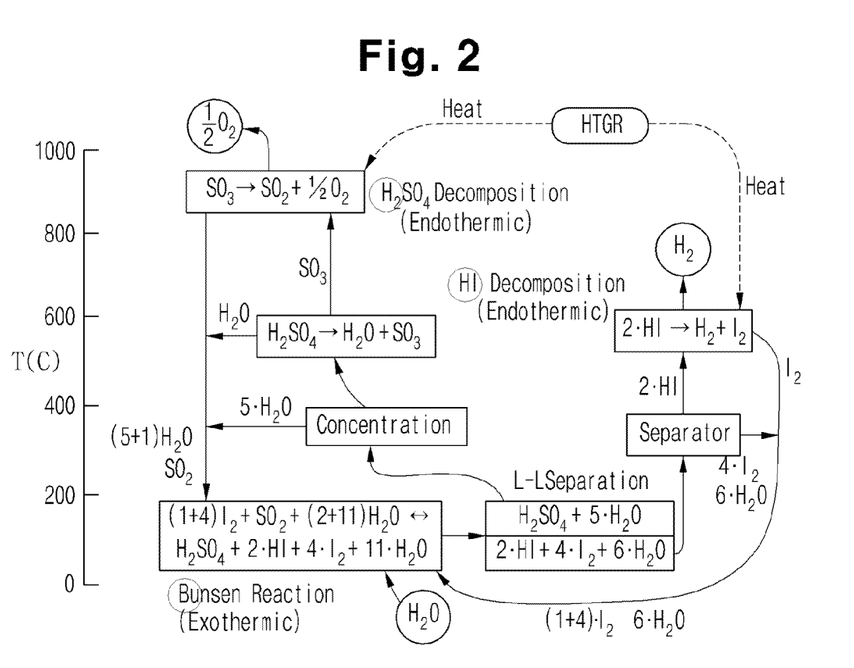
FIG. 2 is a view showing an optimized Bunsen reaction process of an I—S cycle, in which major processes, component materials flow between the processes and temperature levels of each process, according to the present invention.
Figure 3:
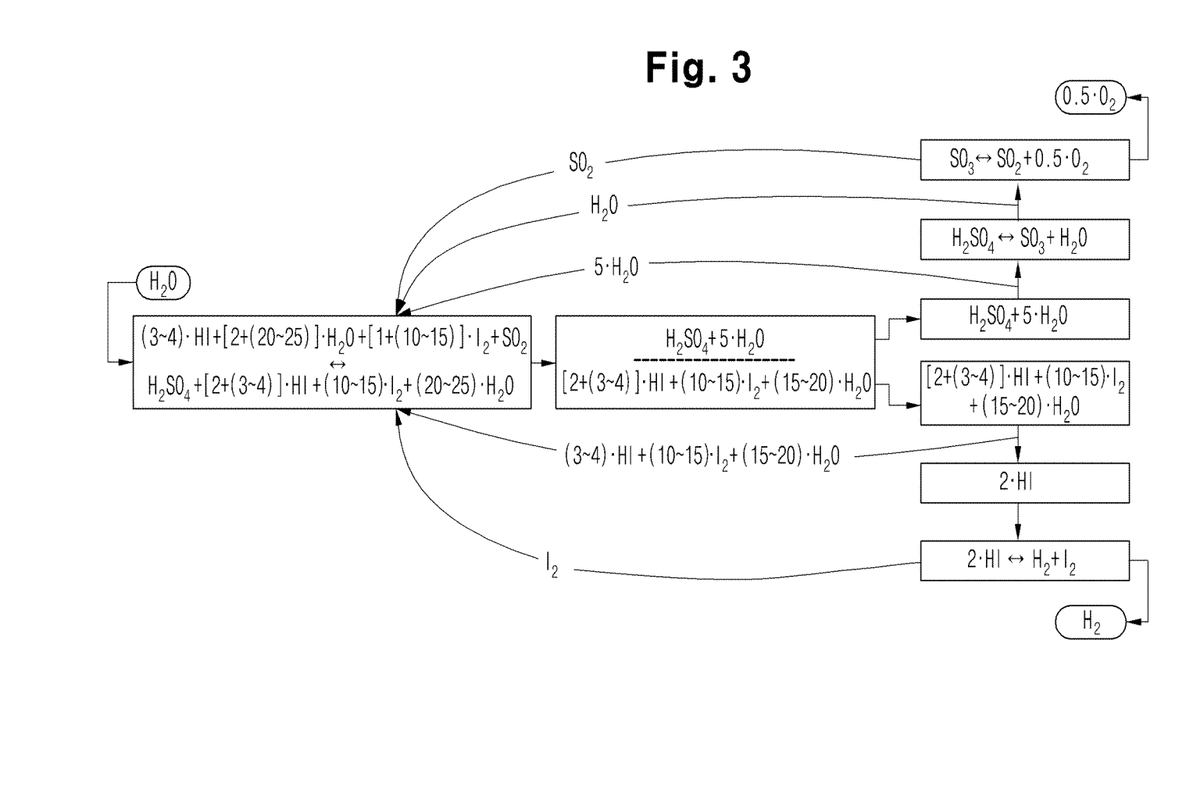
FIG. 3 is a view showing a process of joining a residual hydrogen iodide solution recovered from a hydrogen iodide decomposition process to reactants before a Bunsen reaction in an I—S cycle operated in an optimal operating range according to the present invention.

The sulfuric acid solution and hydrogen iodide solution produced through the Bunsen reaction process are transferred to a sulfuric acid decomposition process and a hydrogen iodide decomposition process, respectively (refer to FIG. 2). In this case, the sulfuric acid solution includes a large amount of water, an extremely small amount of iodine and an extremely small amount of hydrogen iodide, and the hydrogen iodide solution includes a large amount of water, a large amount of iodine and an extremely small amount of sulfuric acid.

In the sulfuric acid decomposition process, before the sulfuric acid decomposition is conducted, low-concentration sulfuric acid is concentrated in order to decrease the consumption of thermal energy used in a process of heating sulfuric acid at high temperature. The concentrated sulfuric acid solution is heated to about 500° C. and thus easily and rapidly decomposed into water ($H_2O$) and sulfur trioxide ($SO_3$). The produced sulfur trioxide ($SO_3$) is heated to about 850° C. and thus decomposed into oxygen ($O_2$) and sulfur dioxide ($SO_2$). Among the decomposition products, oxygen is separated as one of final products, and water and sulfur dioxide recovered from the sulfuric acid concentration and decomposition processes are cooled and then re-circulated to the Bunsen reaction process (refer to FIG. 2).

The high-temperature thermal energy required in the sulfuric acid concentration and decomposition processes is supplied from a high-temperature nuclear reactor. The sulfuric acid solution used in the sulfuric acid concentration and decomposition processes causes apparatuses used in these processes to be aged because it has high corrosive properties in high-temperature environment.

In the hydrogen iodide decomposition process, there are problems in that the decomposition ratio of hydrogen iodide can be greatly decreased by an extremely small amount of iodine included in the hydrogen iodide solution, and the energy efficiency in the hydrogen iodide decomposition process can be decreased by a large amount of excess water included in the hydrogen iodide solution. For this reason, the hydrogen iodide decomposition process is conducted after minimizing the amount of excess iodine and water included in the hydrogen iodide solution. When the hydrogen iodide solution from which excess iodine and water are removed is heated to about 450° C., the heated hydrogen iodide molecules are thermally decomposed into hydrogen ($H_2$) and iodine ($I_2$). The hydrogen ($H_2$) produced through the heating of the hydrogen iodide is separated as another final product, and water and iodine recovered from the hydrogen iodide concentration and decomposition processes are re-circulated to the Bunsen reaction process (refer to FIG. 2).

The hydrogen iodide decomposition process is problematic in that the amount of energy consumed in the iodine separation process and the excess water circulation process is larger than the amount of energy consumed in the decomposition of hydrogen iodide molecules, and in that although the hydrogen iodide solution has very high corrosivity, its detailed thermo-chemical properties are not well known yet.

As described above, problems to be solved in the use of the iodine-sulfur cycle for nuclear hydrogen production are as follows. First, the corrosivity of sulfuric acid and hydrogen iodide must be overcome. The corrosivity of sulfuric acid and hydrogen iodide increases with the increase of process temperature and pressure. Therefore, in order to overcome this corrosivity of sulfuric acid and hydrogen iodide, there is a method of fabricating apparatuses using materials having excellent corrosion resistance, but this method is also problematic in that economical efficiency is decreased because the apparatuses made of these corrosion resistance materials are expensive.

Second, a large amount of excess water and iodine supplied in the Bunsen reaction process must be recovered and recirculated in subsequent processes. However, even in this case, there is a problem in that a large amount of thermal energy is consumed during the recovery and recirculation of excess water and iodine, thus decreasing the energy efficiency of the entire iodine-sulfur cycle.

In order to solve the above problems, General Atomics Co., Ltd. in U.S.A. proposed a method of increasing the concentration of a hydrogen iodide solution higher than an azeotropic point, in which water is removed from the hydrogen iodide solution using phosphoric acid ($H_3PO_4$) as an intermediate substance and then the phosphoric acid is additionally recovered. However, this method is also disadvantageous in that a process of recovering phosphoric acid is additionally required, and thus energy consumption is increased and the entire process is complicated.

Further, Aachen University of Technology in Germany proposed a reactive distillation technology in which a hydrogen iodide solution is simultaneously concentrated and decomposed in a reactive distillation column. However, this reactive distillation technology is also problematic in that high temperature is required in order to decompose hydrogen iodide, and vapor-liquid equilibrium must be maintained throughout the reactive distillation column in order to distill the hydrogen iodide solution for the purpose of concentrating the hydrogen iodide solution, so that high-temperature/high-pressure operation conditions are inevitably required, with the result that the basic problem that the operational environment in the reactive distillation column is not suitable to prevent the corrosion of the reactive distillation column cannot be solved.

Furthermore, Japan Atomic Energy Agency (JAEA), called Japan Atomic Energy Research Institute (JAERI) in the past, has researched an electro-electrodialysis (EED) technology in which a membrane technology and an electrolysis technology are combined in order to concentrate a hydrogen iodide solution. However, this electro-electrodialysis (EED) technology is also problematic in that the basic limitation that a large amount of expensive electrical energy is required must be overcome, and in that the technical difficulty that the size of the membrane, which is structurally weak, must be increased from that of a small laboratory scale to that of a large hydrogen production plant scale must also be solved, thereby commercially using this electro-electrodialysis (EED) technology.

Therefore, the present inventors found that a process for minimizing the amount of excess water and iodine supplied to a Bunsen reaction process can minimize the amount of thermal energy consumed in the recovery and recirculation process thereof, that sulfuric acid having stronger hydrophilicity than hydrogen iodide absorbs excess water in large quantities in a spontaneous liquid-liquid phase separation process, so that, after the a spontaneous liquid-liquid phase separation process, the concentration of hydrogen iodide in a hydrogen iodide solution exceeds a concentration at the azeotropic point without conducting an additional concentration process, with the result that highly-concentrated hydrogen iodide gas can be obtained only through a flashing process, thereby decreasing energy consumption and simplifying the process and thus improving economical efficiency, and that process temperature and pressure can be decreased, thus greatly deceasing the corrosivity in operational environments.

SUMMARY OF THE INVENTION

Accordingly, the present invention has been made to solve the above conventional problems, and an object of the present invention is to provide an iodine-sulfur cycle for nuclear hydrogen production, including a Bunsen reaction process including a liquid-liquid phase separation process, a hydrogen iodide decomposition process and a sulfuric acid decomposition process, which can decrease the corrosivity in operational environments and improve thermo-chemical efficiency.

In order to accomplish the above object, the present invention provides an iodine-sulfur cycle for nuclear hydrogen production, which can decrease the corrosivity in operational environments and improve thermo-chemical efficiency by optimizing process conditions.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

Hereinafter, certain embodiments of the present invention will be described in detail with reference to the attached drawings.

The present invention provides an iodine-sulfur cycle for nuclear hydrogen production, including a Bunsen reaction process including a liquid-liquid phase separation process, a hydrogen iodide decomposition process and a sulfuric acid decomposition process, wherein sulfur dioxide, iodine, and water, which are reactants necessarily used to conduct the Bunsen reaction process, mix with excess water and excess iodine and then react with each other at an operating temperature of 330~350K (57~77° C.) as represented by the following Reaction Formula 1.

[Reaction Formula 1]

In the Reaction Formula 1, based on the composition ratio of reactants at an optimal operating point at which the minimum amount of excess water required to be supplied such that the Bunsen reaction smoothly proceeds in terms of thermodynamics, the minimum amount of excess iodine and the maximum amount of excess water which are necessary for the spontaneous liquid-liquid separation of a sulfuric acid solution and a hydrogen iodide solution, and the minimum amount of excess iodine required in the Bunsen reaction process to prevent the formation of harmful sulfur byproducts in subsequent processes are considered, the optimal operating range of the iodine-sulfur cycle for nuclear hydrogen production is determined in consideration of an operating margin range actually necessary for absorbing the influences due to the transient state caused by the internal or external perturbation of apparatuses during the operation of the iodine-sulfur cycle and an operating allowance range which does not greatly deviate from the optimal operating conditions of the iodine-sulfur cycle.

When reactants are mixed at an optimal composition ratio, after the reaction represented by the Reaction Formula 1, the reaction products are separated into a sulfuric acid solution and a hydrogen iodide solution through a spontaneous liquid-liquid phase separation process, and then the sulfuric acid solution and hydrogen iodide solution are introduced into a sulfuric acid decomposition process and a hydrogen iodide decomposition process, respectively.

In the above Bunsen reaction process, the efficiency of an iodine-sulfur cycle can be increased by optimizing the amount of excess water and iodine introduced into the spontaneous liquid-liquid phase separation process for the sulfuric acid solution and hydrogen iodide solution.

The Bunsen reaction process can be conducted at an operating temperature at which iodine cannot be solidified and side reactions can be prevented. It is preferred that the Bunsen reaction process be conducted at an operating temperature of 330~350K.

It is more preferred that the Bunsen reaction process be controlled to have an optimal operating point at a temperature of 330K as represented by the following Reaction Formula 2.

[Reaction Formula 2]

In this case, the concentration of hydrogen iodide in the hydrogen iodide solution produced and separated by the Bunsen reaction process conducted as the reaction Formula 1 can exceed the concentration at the azeotropic point.

An azeotropic point is a boiling point at which a liquid mixture is simultaneously liquefied and gasified when the liquid mixture is distilled at a predetermined pressure. It is difficult to increase the concentration of a specific material included in a mixture solution reaching the azeotropic point using general heating methods. However, the concentration of hydrogen iodide in the hydrogen iodide solution prepared according to the present invention exceeds the concentration at the azeotropic point, and thus highly-concentrated hydrogen iodide gas can be separated from the mixed solution of sulfuric acid and hydrogen iodide only through a flashing process without undergoing a high-temperature and high-pressure distillation process, thereby deceasing the corrosivity in operational environments and improving the convenience of the operation and maintenance of the system and process for producing nuclear hydrogen.

Further, the present invention provides an iodine-sulfur cycle for nuclear hydrogen production, in which highly-concentrated hydrogen iodide gas is separated from a hydrogen iodide solution through a flashing process, and in which a residual hydrogen iodide solution having a material balance represented by the following Reaction Formula 3 is recirculated to the Bunsen reaction process.

[Reaction Formula 3]

The recirculating residual hydrogen iodide solution is mixed with reactants before the Bunsen reaction process, and then a Bunsen reaction process represented by the following Reaction Formula 4 is conducted using the mixture to produce a liquid-liquid phase separated hydrogen iodide solution having a material balance represented by the following Reaction Formula 5.

[Reaction Formula 4]

[Reaction Formula 5]

Figure 4:
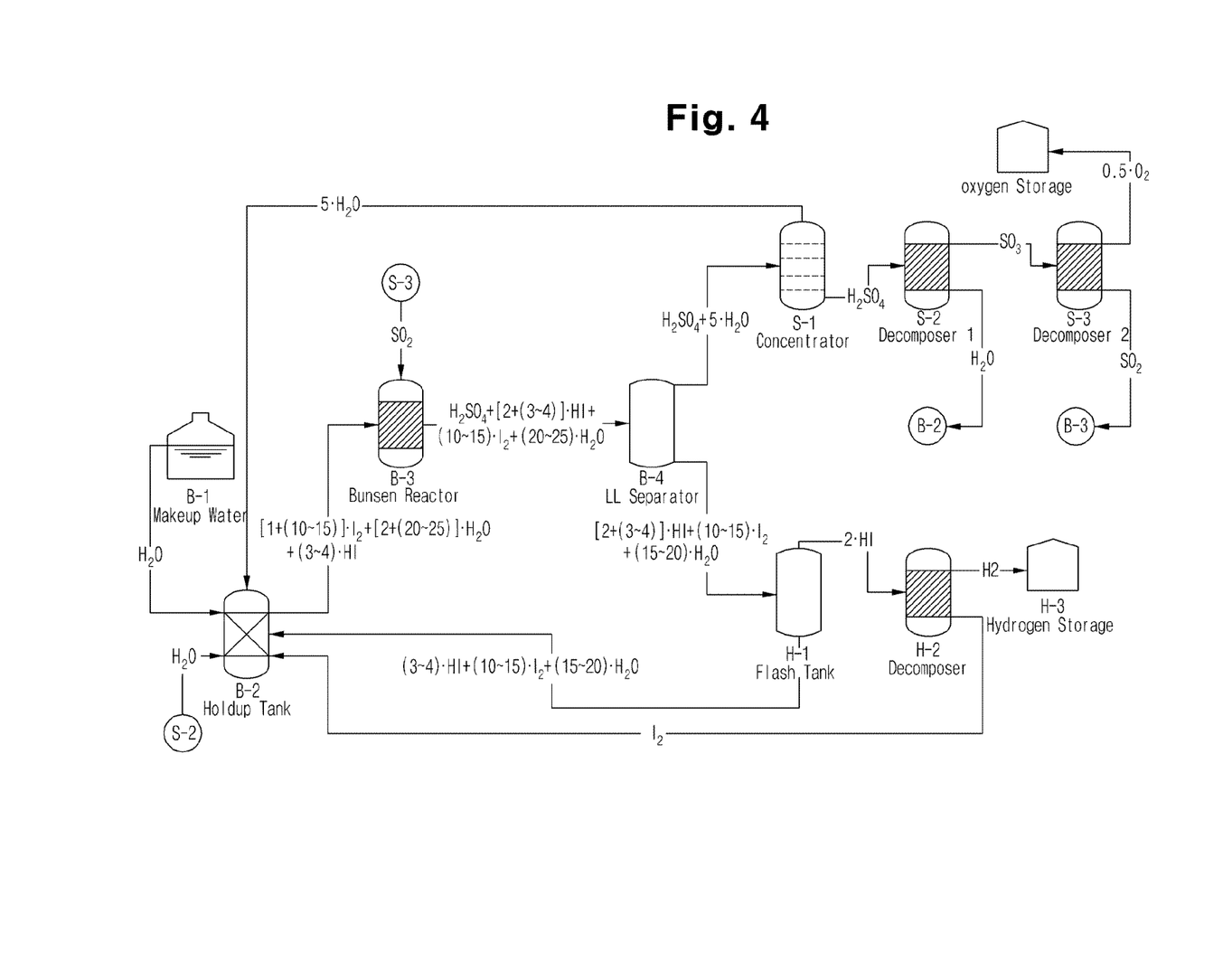
FIG. 4 is a systematic view showing an iodine-sulfur (I—S) cycle based on FIG. 3 according to the present invention.

As shown in FIG. 4, the residual hydrogen iodide solution of the Reaction Formula 3, excess water and iodine recovered through a sulfuric acid decomposition process and a hydrogen iodide decomposition process, and newly-supplied water are introduced into a holdup tank for mixing reactants before a Bunsen reaction, and then mixed with each other. The mixture is introduced into a Bunsen reactor and then reacted with sulfur dioxide recovered through the sulfuric acid decomposition process to produce a reaction product represented by the Reaction Formula 4. The reaction product is introduced into a liquid-liquid phase separator and then spontaneously separated into a hydrogen iodide solution and a sulfuric acid solution. Since sulfuric acid has stronger hydrophilicity than hydrogen iodide, the sulfuric acid solution is separated from the liquid-liquid phase separator in a state in which it contains a large amount of water, and then introduced into a sulfuric acid concentrator.

Meanwhile, the hydrogen iodide solution separated from the liquid-liquid phase separator has a material balance represented by the Reaction Formula 5. Since the concentration of hydrogen iodide in the hydrogen iodide solution exceeds the concentration at the azeotropic point, the hydrogen iodide solution is introduced into a flash tank instead of a conventional distillation tower, so that hydrogen iodide is flashed at relatively low temperature and pressure, with the result that highly-concentrated hydrogen iodide gas is obtained, thereby producing hydrogen in high efficiency.

In this case, the concentration of hydrogen iodide included in the hydrogen iodide solution remaining after the flashing process is approximate to a concentration at the pseudo-azeotropic point.

Figure 5:
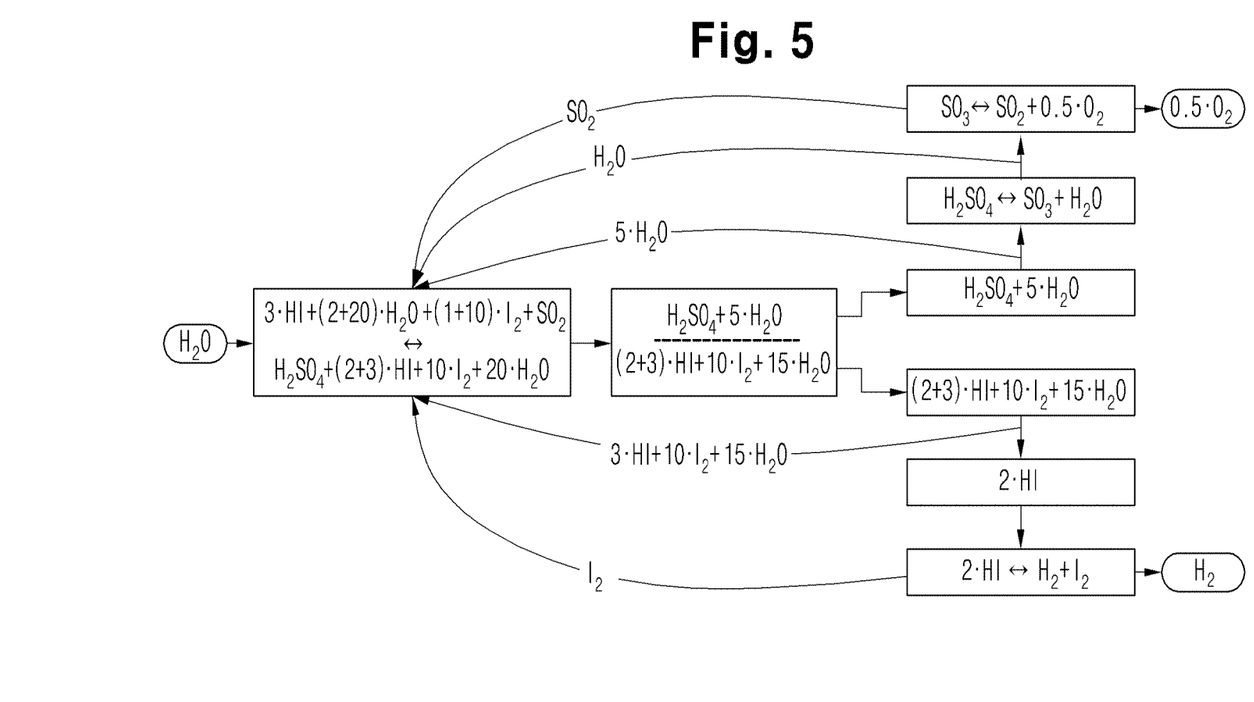
FIG. 5 is a view showing a process of joining a residual hydrogen iodide solution recovered from a hydrogen iodide decomposition process to reactants before a Bunsen reaction in an I—S cycle operated at an optimal operating point according to the present invention.

More preferably, a liquid-liquid phase separated hydrogen iodide solution may be produced at an optimal operating point represented by the following Reaction Formulae 6 to 8 in addition to the above Reaction Formulae 3 to 5 (refer to FIG. 5).

Residual hydrogen iodide solution: $3HI+10.I_2+15.H_2O$ [Reaction Formula 6]

Bunsen reaction process: $3HI+(2+20).H_2O+(1+10).I_2+SO_2 \leftrightarrow H_2SO_4+(2+3).HI+10.I_2+20.H_2O$ [Reaction Formula 7]

Liquid-liquid phase separated hydrogen iodide solution: $(2+3).HI+10.I_2+15.H_2O$ [Reaction Formula 8]

Figure 6:
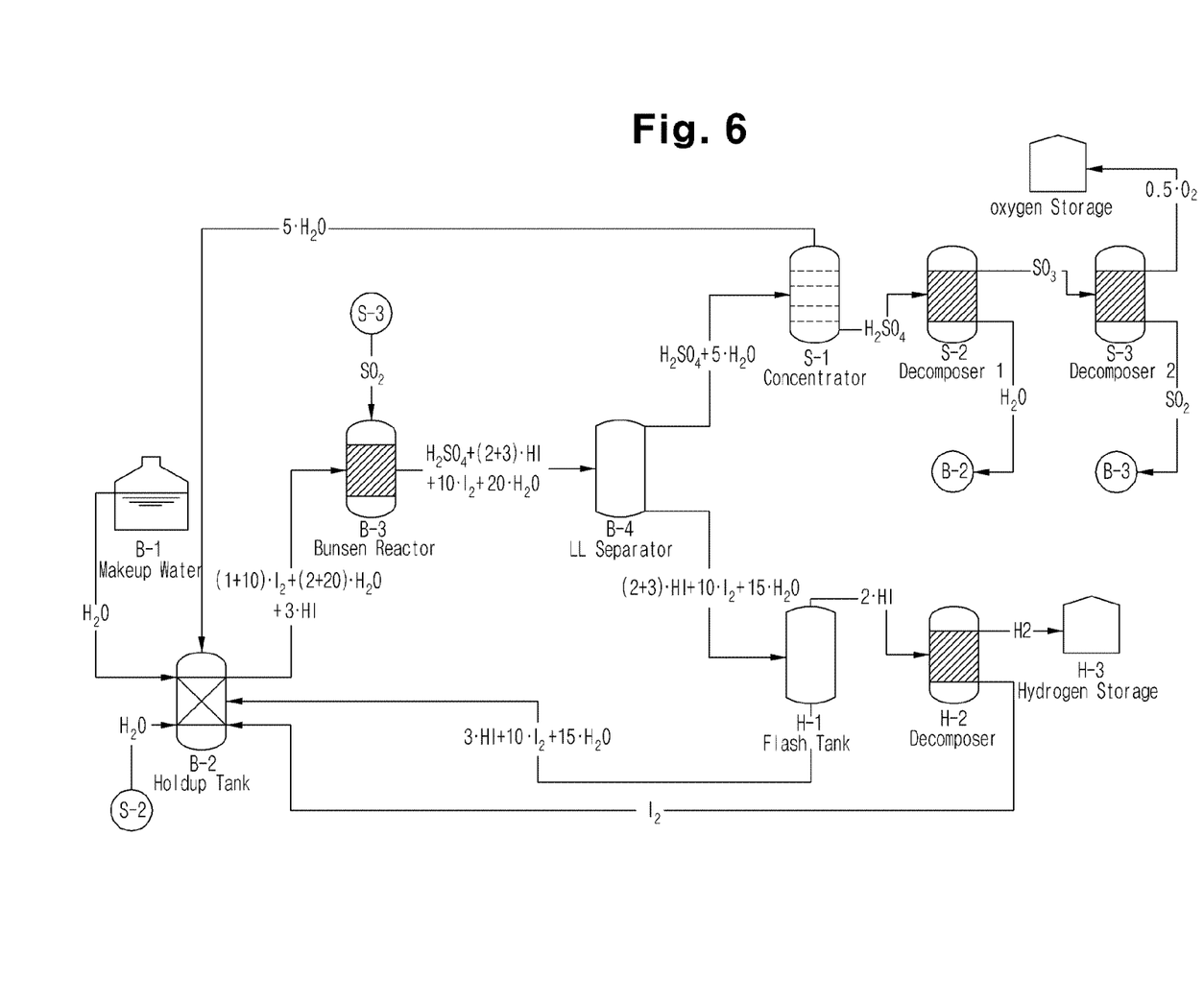
FIG. 6 is a systematic view showing an iodine-sulfur (I—S) cycle based on FIG. 5 according to the present invention.

FIG. 6 is a systematic view showing the optimal operating point of an iodine-sulfur cycle for nuclear hydrogen production using the above Reaction Formulae 6 to 8.

As shown in FIG. 6, the residual hydrogen iodide solution having a material balance represented by the Reaction Formula 6, excess water and iodine recovered through a sulfuric acid decomposition process and a hydrogen iodide decomposition process, and newly-supplied water are introduced into a holdup tank for mixing reactants before a Bunsen reaction, and then mixed with each other. The mixture is introduced into a Bunsen reactor and then reacted with sulfur dioxide recovered through the sulfuric acid decomposition process to produce a reaction product represented by the Reaction Formula 7. The reaction product is introduced into a liquid-liquid phase separator and then spontaneously separated into a hydrogen iodide solution and a sulfuric acid solution. Since sulfuric acid has stronger hydrophilicity than hydrogen iodide, the sulfuric acid solution is separated from the liquid-liquid phase separator in a state in which it contains a large amount of water, and then introduced into a sulfuric acid concentrator.

Meanwhile, the hydrogen iodide solution separated from the liquid-liquid phase separator has a material balance represented by the Reaction Formula 8. Since the concentration of hydrogen iodide in the hydrogen iodide solution exceeds the concentration at the azeotropic point, the hydrogen iodide solution is introduced into a flash tank instead of a conventional distillation tower, so that hydrogen iodide is flashed at relatively low temperature and pressure, with the result that highly-concentrated hydrogen iodide gas is obtained, thereby producing hydrogen in high efficiency.

In this case, the concentration of hydrogen iodide included in the hydrogen iodide solution remaining after the flashing process is approximate to a concentration at a pseudo-azeotropic point.

Figure 7:
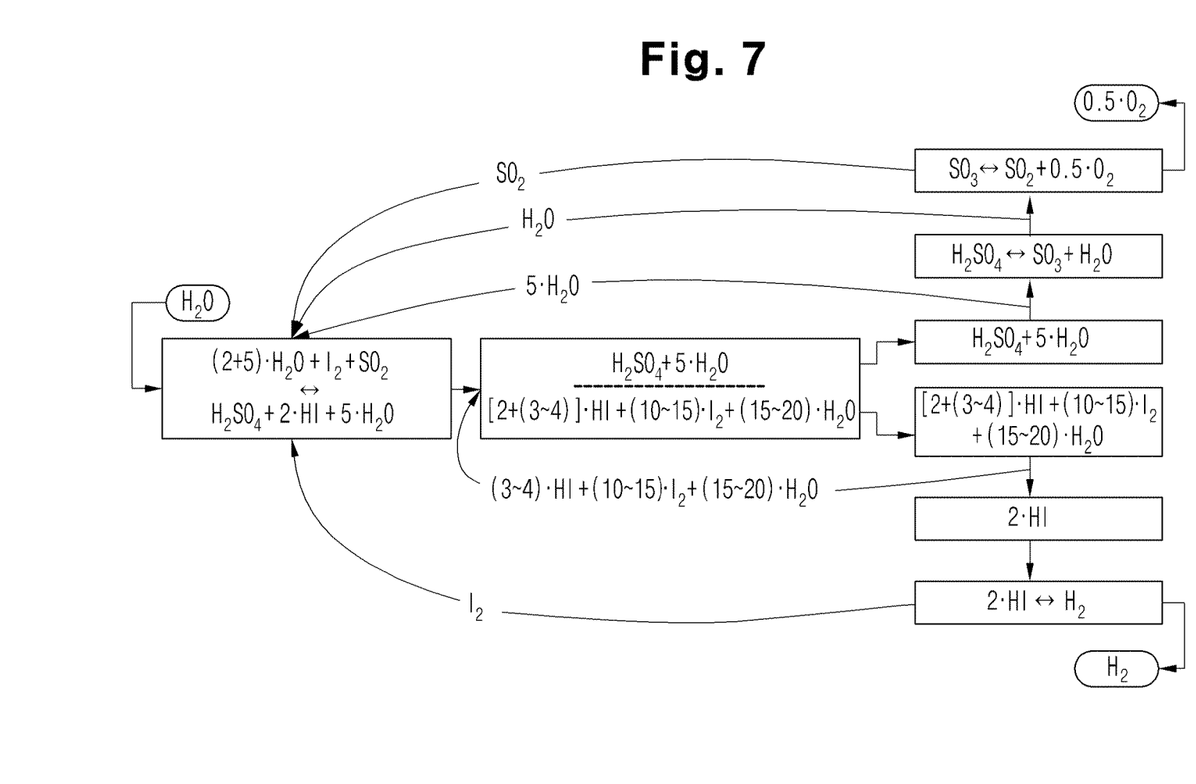
FIG. 7 is a view showing a process of joining a residual hydrogen iodide solution recovered from a hydrogen iodide decomposition process to reaction products after a Bunsen reaction in an I—S cycle operated in an optimal operating range according to the present invention.

Furthermore, the present invention provides an iodine-sulfur cycle for nuclear hydrogen production, in which the residual hydrogen iodide solution is mixed with the reaction product after the Bunsen reaction process to form a mixed solution represented by the following Reaction Formula 9, and then the mixed solution is separated into a hydrogen iodide solution represented by the following Reaction Formula 10 through a liquid-liquid phase separation process (refer to FIG. 7).

Mixed solution: $H_2SO_4+[2+(3\sim4)].HI+(10\sim15)I_2+(20\sim25).H_2O$ [Reaction Formula 9]

Hydrogen iodide solution after liquid-liquid phase separation: $[2+(3\sim4)].HI+(10\sim15).I_2+(15\sim20).H_2O$ [Reaction Formula 10]

Figure 8:
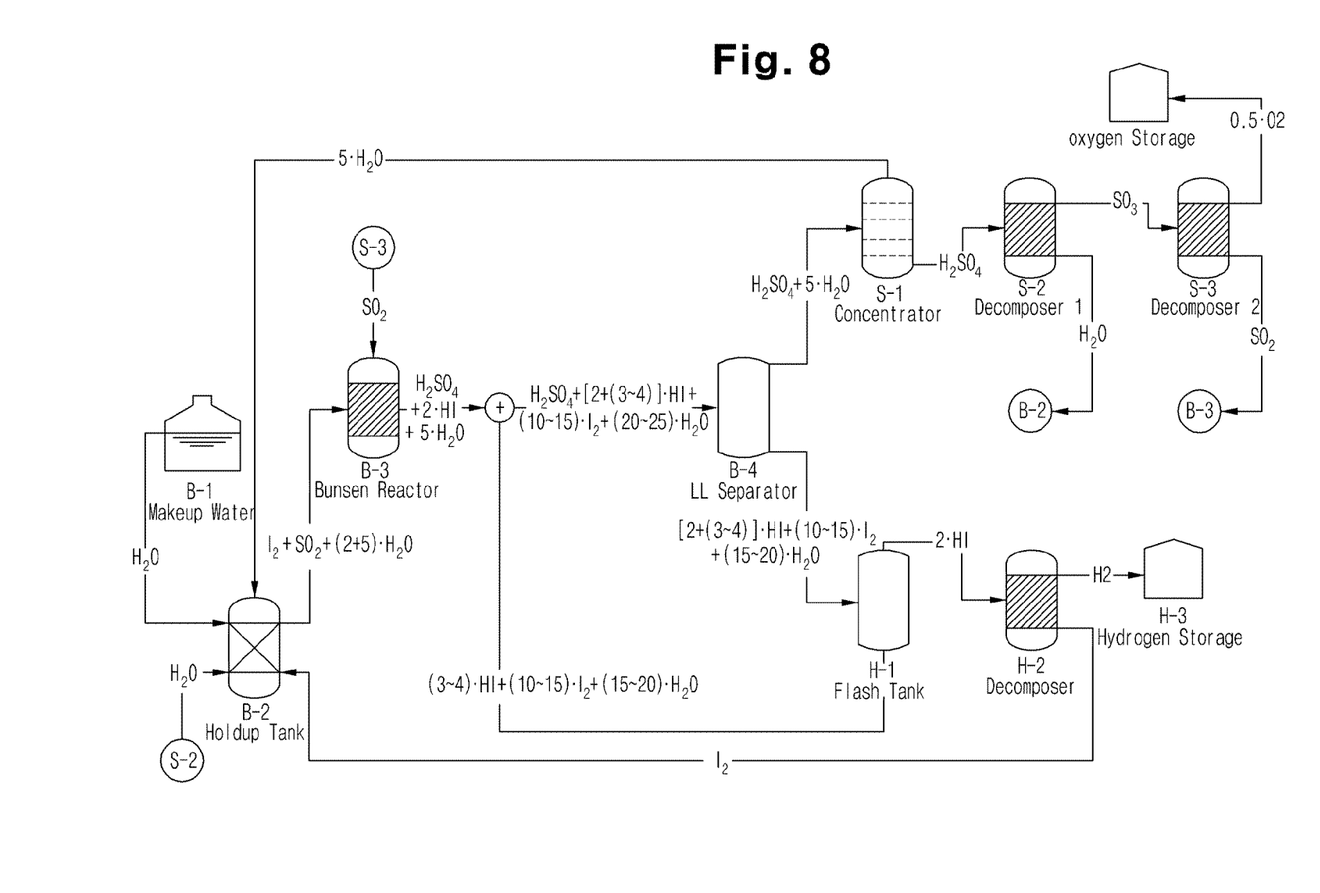
FIG. 8 is a systematic view showing an iodine-sulfur (I—S) cycle based on FIG. 7 according to the present invention.

FIG. 8 is a systematic view showing the optimal operating point of an iodine-sulfur cycle for nuclear hydrogen production using the above Reaction Formulae 3, 9 and 10.

As shown in FIG. 8, the reaction product produced through a Bunsen reaction process and the residual hydrogen iodide solution of the Reaction Formula 3 are introduced into a mixing tank and then mixed with each other to form a mixed solution having a material balance represented by the following Reaction Formula 9. Then, the mixed solution is introduced into a liquid-liquid phase separator and then spontaneously separated into a hydrogen iodide solution and a sulfuric acid solution. Since sulfuric acid has stronger hydrophilicity than hydrogen iodide, the sulfuric acid solution is separated from the liquid-liquid phase separator in a state in which it contains a large amount of water, and then introduced into a sulfuric acid concentrator.

Meanwhile, the hydrogen iodide solution separated from the liquid-liquid phase separator has a material balance represented by the Reaction Formula 10. Since the concentration of hydrogen iodide in the hydrogen iodide solution exceeds the concentration at the azeotropic point, the hydrogen iodide solution is introduced into a flash tank instead of a conventional distillation tower, so that hydrogen iodide is flashed at relatively low temperature and pressure, with the result that highly-concentrated hydrogen iodide gas is obtained, thereby producing hydrogen in high efficiency.

In this case, the concentration of hydrogen iodide included in the hydrogen iodide solution remaining after the flashing process is approximate to a concentration at a pseudo-azeotropic point.

Figure 9:
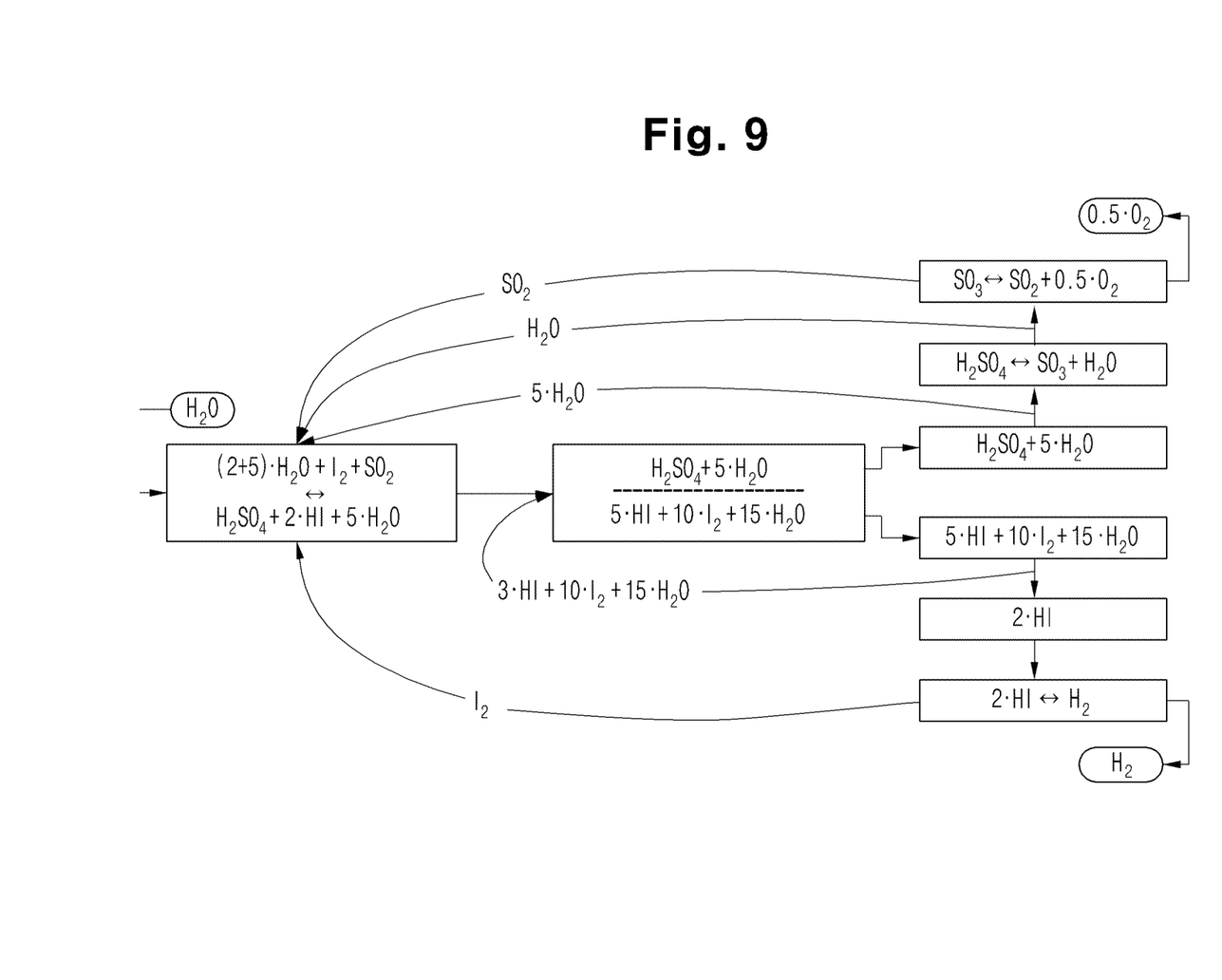
FIG. 9 is a view showing a process of joining a residual hydrogen iodide solution recovered from a hydrogen iodide decomposition process to reaction products after a Bunsen reaction in an I—S cycle operated at an optimal operating point according to the present invention.

More preferably, a liquid-liquid phase separated hydrogen iodide solution may be produced at an optimal operating point represented by the following Reaction Formulae 6, 11 and 12 in addition to the above Reaction Formulae 3, 9 and 10 (refer to FIG. 9).

Mixed solution: $H_2SO_4+[2+3].HI+10.I_2+20.H_2O$ [Reaction Formula 11]

Liquid-liquid phase separated hydrogen iodide solution: $(2+3).HI+10.I_2+15.H_2O$ [Reaction Formula 12]

Figure 10:
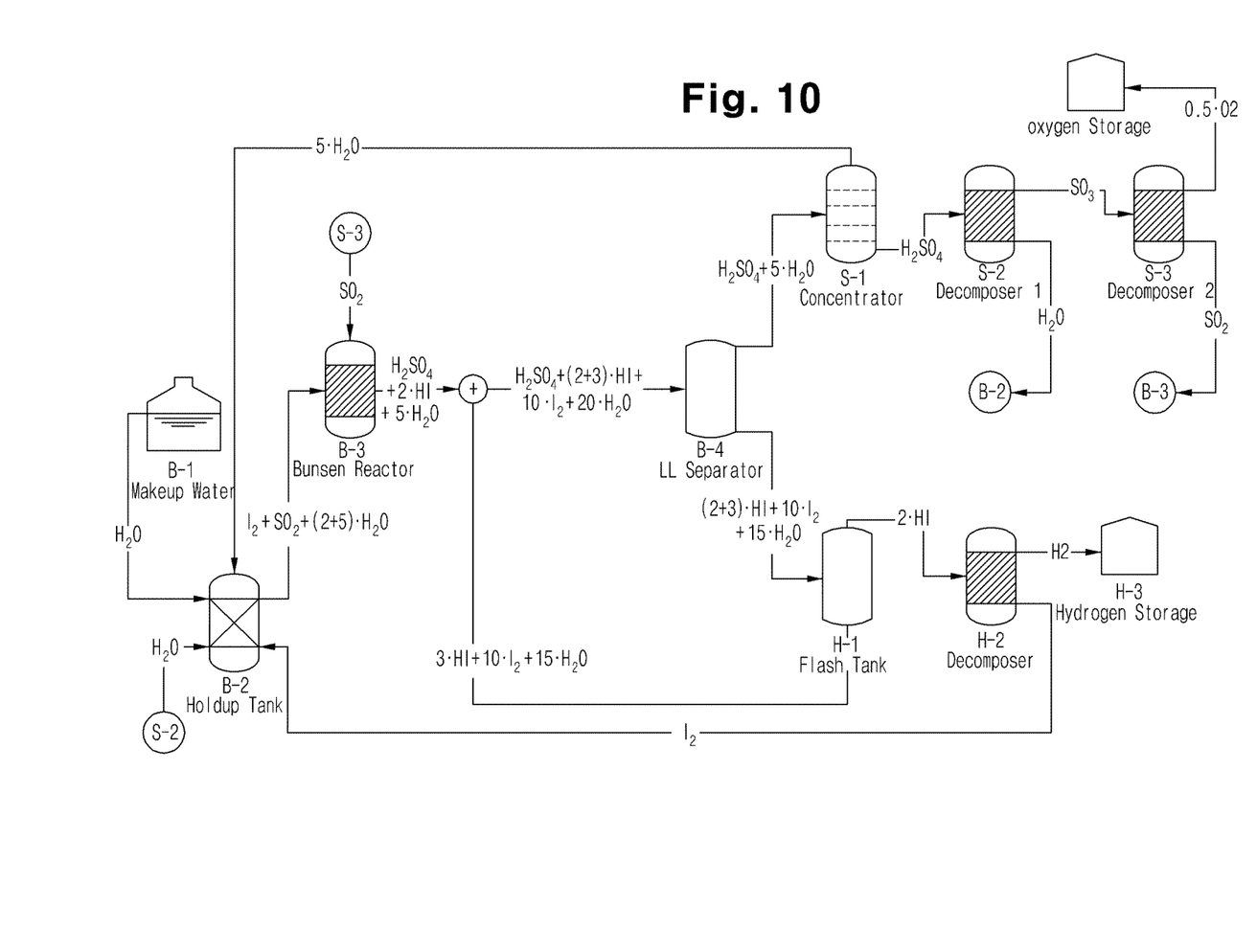
FIG. 10 is a systematic view showing an iodine-sulfur (I—S) cycle based on FIG. 9 according to the present invention.

FIG. 10 is a systematic view showing the optimal operating point of an iodine-sulfur cycle for nuclear hydrogen production using the above Reaction Formulae 6, 11 and 12.

As shown in FIG. 10, the reaction product produced through a Bunsen reaction process and the residual hydrogen iodide solution of the Reaction Formula 6 are introduced into a mixing tank and then mixed with each other to form a mixed solution having a material balance represented by the following Reaction Formula 11. Then, the mixed solution is introduced into a liquid-liquid phase separator and then spontaneously separated into a hydrogen iodide solution and a sulfuric acid solution. Since sulfuric acid has stronger hydrophilicity than hydrogen iodide, the sulfuric acid solution is separated from the liquid-liquid phase separator in a state in which it contains a large amount of water, and then introduced into a sulfuric acid concentrator.

Meanwhile, the hydrogen iodide solution separated from the liquid-liquid phase separator has a material balance represented by the Reaction Formula 12. Since the concentration of hydrogen iodide in the hydrogen iodide solution exceeds the concentration at the azeotropic point, the hydrogen iodide solution is introduced into a flash tank instead of a conventional distillation tower, so that hydrogen iodide is flashed at relatively low temperature and pressure, with the result that highly-concentrated hydrogen iodide gas is obtained, thereby producing hydrogen with high efficiency.

In this case, the concentration of hydrogen iodide included in the hydrogen iodide solution remaining after the flashing process is approximate to a concentration at a pseudo-azeotropic point.

Since the hydrogen iodide exceeding an azeotropic point through a flashing process is easily gasified, the concentration of the hydrogen iodide in the residual hydrogen iodide solution is decreased under the condition of a pseudo-azeotropic point, but iodine mostly remains in the residual hydrogen iodide solution because it has very low volatility. However, since a large amount of hydrogen iodide and water remains in the residual hydrogen iodide solution still, iodine is not easily solidified because its concentration is relatively low, so that the conventional problem that pipes are clogged by the solidification of iodine hardly occurs, thereby stably conducting the operation of an iodine-sulfur cycle for nuclear hydrogen production.

Figure 11:
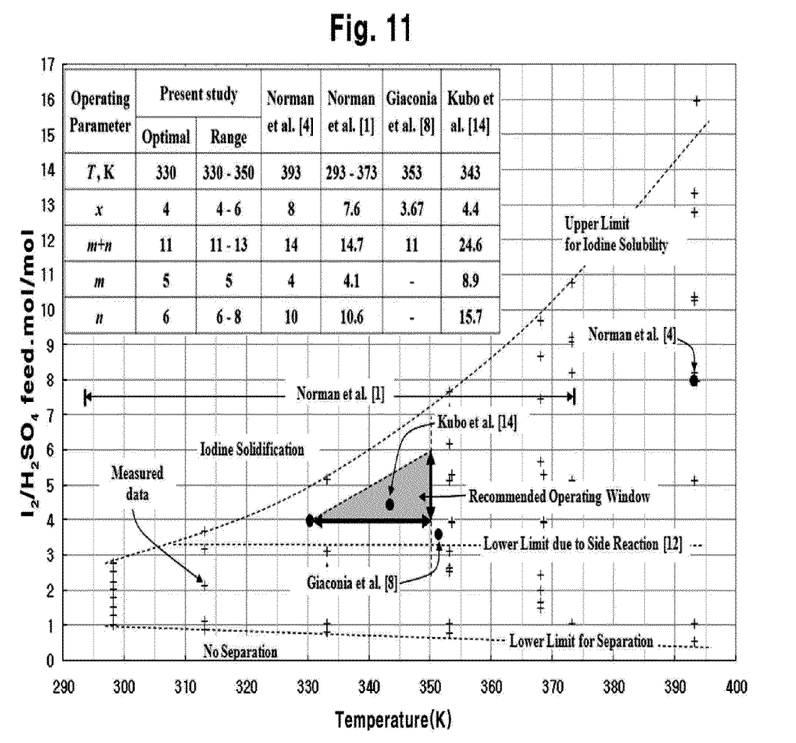
FIG. 11 schematically shows the optimal operating range and optimal operating point of the I—S cycle of the present invention by comparing the operating ranges presented by precedent researchers with experimental data confirmed by the examination of documents.

FIG. 11 schematically shows the optimal operating range of the Reaction Formula 1 and the optimal operating point of the Reaction Formula 2 according to the present invention. As shown in FIG. 11, the optimal operating range and optimal operating point according to the present invention are proposed based on the experimental data confirmed by document examination.

Figure 12:
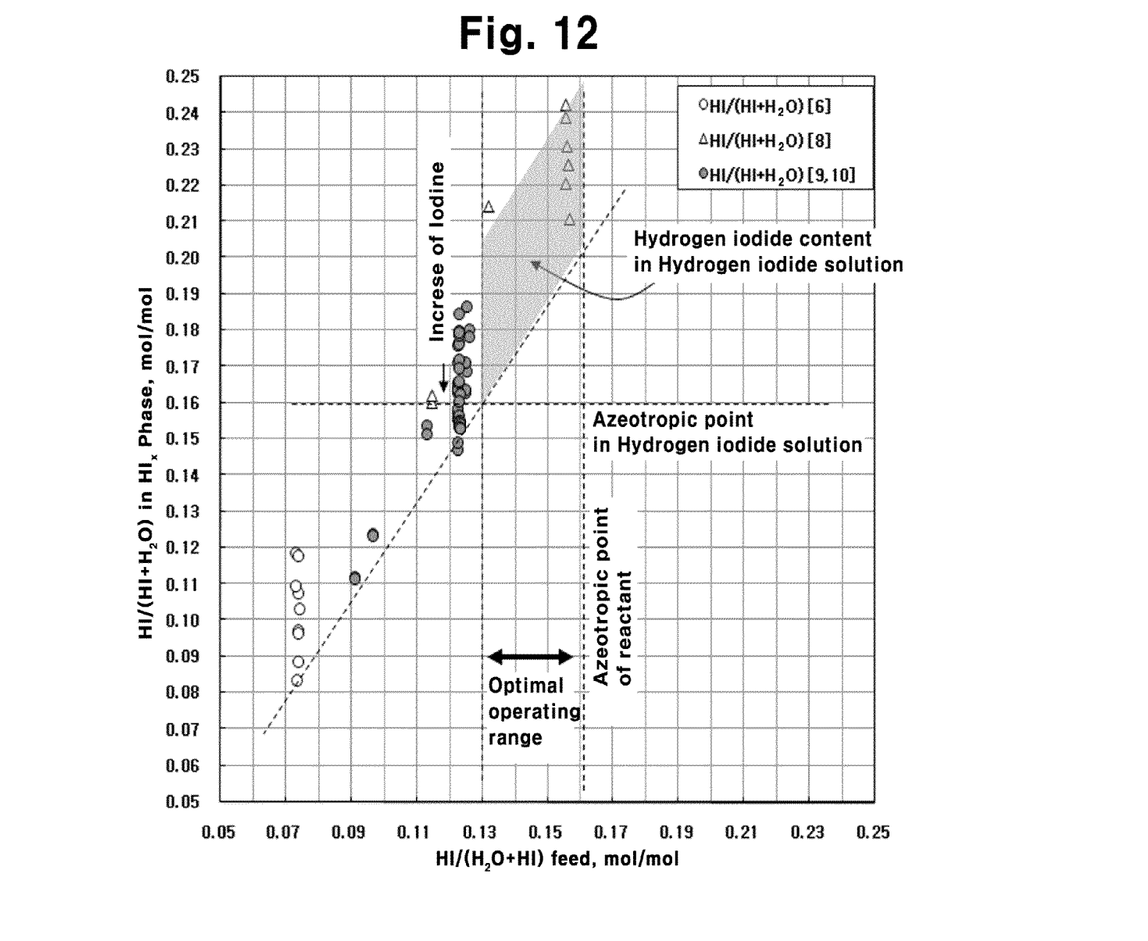
FIG. 12 shows the fact that the composition of the hydrogen iodide solution obtained through the liquid-liquid phase separation of reactants after a Bunsen reaction can exceed an azeotropic point when a Bunsen reaction process in an I—S cycle for nuclear hydrogen production is performed in the optimal operating range or at the optimal operating point of the I—S cycle of the present invention through experimental data confirmed by the examination of documents.

FIG. 12 shows the fact that the composition of the hydrogen iodide solution obtained through the liquid-liquid phase separation of reactants after a Bunsen reaction can exceed an azeotropic point when a Bunsen reaction process in an I—S cycle for nuclear hydrogen production is performed in the optimal operating range or at the optimal operating point of the I—S cycle of the present invention through experimental data confirmed by the examination of documents.

As described above, the iodine-sulfur cycle according to the present invention is advantageous in that a process for minimizing the amount of excess water and iodine supplied to a Bunsen reaction process minimizes the amount of thermal energy consumed in the recovery and recirculation process thereof, in that sulfuric acid having stronger hydrophilicity than hydrogen iodide absorbs excess water in large quantities in a spontaneous liquid-liquid phase separation process, so that, after the spontaneous liquid-liquid phase separation process, the concentration of hydrogen iodide in a hydrogen iodide solution exceeds a concentration at the azeotropic point without conducting an additional concentration process, with the result that highly-concentrated hydrogen iodide gas can be obtained only through a flashing process, thereby decreasing energy consumption and simplifying the process and thus improving economical efficiency, and in that process temperature and pressure can be decreased, thus greatly deceasing the corrosivity in an operational environment. Therefore, the iodine-sulfur cycle according to the present invention can be usefully used for high-efficient and environmentally-friendly nuclear hydrogen production.

Although certain preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An iodine-sulfur cycle for nuclear hydrogen production, comprising:
   a Bunsen reaction process including a liquid-liquid phase separation process;
   a hydrogen iodide decomposition process; and
   a sulfuric acid decomposition process,
   wherein sulfur dioxide, iodine, and water, which are reactants necessarily used to conduct the Bunsen reaction process, mix with excess water and excess iodine and then react with each other at an operating temperature of 330~350K (57~77° C.) as represented by the following Reaction Formula 1:

<Reaction Formula 1> wherein concentration of hydrogen iodide in the hydrogen iodide solution produced and separated by the Bunsen reaction process conducted as the reaction Formula 1 exceeds a concentration at an azeotropic point; and
   wherein the cycle further comprising a flashing process of separating hydrogen iodide from the hydrogen iodide solution.

2. The iodine-sulfur cycle for nuclear hydrogen production according to claim 1, wherein the Bunsen reaction process has an optimal operating point at a temperature of 330K as represented by the following Reaction Formula 2:

<Reaction Formula 2>.

3. The iodine-sulfur cycle for nuclear hydrogen production according to claim 1, wherein, in the Bunsen reaction process conducted as represented by the Reaction Formula 1, an amount of excess water and iodine introduced into a spontaneous liquid-liquid phase separation process for a sulfuric acid solution and a hydrogen iodide solution is optimized, thus increasing efficiency of the entire iodine-sulfur cycle.

4. The iodine-sulfur cycle for nuclear hydrogen production according to claim 1, further comprising:
   a flashing process of separating hydrogen iodide from the hydrogen iodide solution; and
   a recirculation process of recirculating a residual hydrogen iodide solution having a material balance represented by the following Reaction Formula 3 to the Bunsen reaction process, <Reaction Formula 3>.

5. The iodine-sulfur cycle for nuclear hydrogen production according to claim 4, wherein the recirculating residual hydrogen iodide solution is mixed with reactants before the Bunsen reaction process of claim 1, and then a Bunsen reaction process represented by the following Reaction Formula 4 is conducted using the mixture to produce a liquid-liquid phase separated hydrogen iodide solution having a material balance represented by the following Reaction Formula 5:

<Reaction Formula 4>

<Reaction Formula 5>.

6. The iodine-sulfur cycle for nuclear hydrogen production according to claim 5, wherein the Reaction Formulae 3 to 5 have optimal operating points represented by the following Reaction Formulae 6 to 8, respectively:

<Reaction Formula 6>

<Reaction Formula 7>

<Reaction Formula 8>.

7. The iodine-sulfur cycle for nuclear hydrogen production according to claim 4, wherein the residual hydrogen iodide solution represented by the Reaction Formula 1 is mixed with the reaction product after the Bunsen reaction process of claim 1 to form a mixed solution represented by the following Reaction Formula 9, and then the mixed solution is separated into a hydrogen iodide solution represented by the following Reaction Formula 10 through a liquid-liquid phase separation process:

Mixed solution: $H_2SO_4 + [2+(3\sim4)].HI + (10\sim15)I_2 + (20\sim25).H_2O$  <Reaction Formula 9>

Hydrogen iodide solution after liquid-liquid phase separation: $[2+(3\sim4)].HI + (10\sim15).I_2 + (15\sim20).H_2O$  <Reaction Formula 10>.

8. The iodine-sulfur cycle for nuclear hydrogen production according to claim 7, wherein the Reaction Formulae Reaction Formulae 3, 9 and 10 have optimal operating points represented by the Reaction Formula 6 of claim 7 and the following Reaction Formulae 11 and 12, respectively:

Mixed solution: $H_2SO_4 + [2+3].HI + 10.I_2 + 20.H_2O$  <Reaction Formula 11>

Liquid-liquid phase separated hydrogen iodide solution: $(2+3).HI + 10.I_2 + 15.H_2O$  <Reaction Formula 12>.

9. The iodine-sulfur cycle for nuclear hydrogen production according to claim 4, wherein concentration of hydrogen iodide in the residual hydrogen iodide solution is a concentration at the pseudo-azeotropic point.

10. An iodine-sulfur cycle for nuclear hydrogen production, comprising:

a Bunsen reaction process including a liquid-liquid phase separation process;

a hydrogen iodide decomposition process; and a sulfuric acid decomposition process, wherein sulfur dioxide, iodine, and water, which are reactants necessarily used to conduct the Bunsen reaction process, mix with excess water and excess iodine and then react with each other at an operating temperature of 330~350K (57~77° C.) as represented by the following Reaction Formula 1:

$(5\sim7).I_2 + SO_2 + (13\sim15).H_2O \leftrightarrow [2HI + 4.I_2 + (6\sim8).H_2O] + [H_2SO_4 + 5.H_2O]$;  <Reaction Formula 1> wherein concentration of hydrogen iodide in the hydrogen iodide solution produced and separated by the Bunsen reaction process conducted as the reaction Formula 1 exceeds a concentration at an azeotropic point;

wherein the cycle further comprising a flashing process of separating hydrogen iodide from the hydrogen iodide solution, and wherein $SO_2$ from the sulfuric acid decomposition process is recycled to the Bunsen reaction.

11. The iodine-sulfur cycle for nuclear hydrogen production according to claim 10, wherein the Bunsen reaction process has an optimal operating point at a temperature of 330K as represented by the following Reaction Formula 2:

$5.I_2 + SO_2 + 13.H_2O \leftrightarrow [2HI + 4.I_2 + 6.H_2O] + [H_2SO_4 + 5.H_2O]$  <Reaction Formula 2>.

12. The iodine-sulfur cycle for nuclear hydrogen production according to claim 10, wherein, in the Bunsen reaction process conducted as represented by the Reaction Formula 1, an amount of excess water and iodine introduced into a spontaneous liquid-liquid phase separation process for a sulfuric acid solution and a hydrogen iodide solution is optimized, thus increasing efficiency of the entire iodine-sulfur cycle.

13. The iodine-sulfur cycle for nuclear hydrogen production according to claim 10, further comprising:

a flashing process of separating hydrogen iodide from the hydrogen iodide solution; and a recirculation process of recirculating a residual hydrogen iodide solution having a material balance represented by the following Reaction Formula 3 to the Bunsen reaction process:

Residual hydrogen iodide solution: $(3\sim4)HI + (10\sim15).I_2 + (15\sim20).H_2O$  <Reaction Formula 3>.

14. The iodine-sulfur cycle for nuclear hydrogen production according to claim 13, wherein the recirculating residual hydrogen iodide solution is mixed with reactants before the Bunsen reaction process of claim 11, and then a Bunsen reaction process represented by the following Reaction Formula 4 is conducted using the mixture to produce a liquid-liquid phase separated hydrogen iodide solution having a material balance represented by the following Reaction Formula 5:

Bunsen reaction process: $(3\sim4)HI + [2+(20\sim25)].H_2O + [1+(10\sim15)].I_2 + SO_2 \leftrightarrow H_2SO_4 + [2+(3\sim4)].HI + (10\sim15).I_2 + (20\sim25).H_2O$  <Reaction Formula 4>

Liquid-liquid phase separated hydrogen iodide solution: $[2+(3\sim4)].HI + (10\sim15).I_2 + (15\sim20).H_2O$  <Reaction Formula 5>.

15. The iodine-sulfur cycle for nuclear hydrogen production according to claim 14, wherein the Reaction Formulae 3 to 5 have optimal operating points represented by the following Reaction Formulae 6 to 8, respectively:

Residual hydrogen iodide solution: $3HI + 10.I_2 + 15.H_2O$  <Reaction Formula 6>

Bunsen reaction process: $3HI + (2+20).H_2O + (1+10).I_2 + SO_2 \leftrightarrow H_2SO_4 + (2+3).HI + 10.I_2 + 20.H_2O$  <Reaction Formula 7>

Liquid-liquid phase separated hydrogen iodide solution: $(2+3).HI + 10.I_2 + 15.H_2O$  <Reaction Formula 8>.

16. The iodine-sulfur cycle for nuclear hydrogen production according to claim 13, wherein the residual hydrogen iodide solution represented by the Reaction Formula 1 is mixed with the reaction product after the Bunsen reaction process of claim 11 to form a mixed solution represented by the following Reaction Formula 9, and then the mixed solution is separated into a hydrogen iodide solution represented by the following Reaction Formula 10 through a liquid-liquid phase separation process:

Mixed solution: $H_2SO_4 + [2+(3\sim4)].HI + (10\sim15)I_2 + (20\sim25).H_2O$  <Reaction Formula 9>

Hydrogen iodide solution after liquid-liquid phase separation: $[2+(3\sim4)].HI + (10\sim15).I_2 + (15\sim20).H_2O$  <Reaction Formula 10>.

17. The iodine-sulfur cycle for nuclear hydrogen production according to claim 16, wherein the Reaction Formulae Reaction Formulae 3, 9 and 10 have optimal operating points represented by the Reaction Formula 6 of claim 16 and the following Reaction Formulae 11 and 12, respectively:

Mixed solution: $H_2SO_4 + [2+3].HI + 10.I_2 + 20.H_2O$  <Reaction Formula 11>

Liquid-liquid phase separated hydrogen iodide solution: $(2+3).HI + 10.I_2 + 15.H_2O$  <Reaction Formula 12>.

18. The iodine-sulfur cycle for nuclear hydrogen production according to claim 13, wherein concentration of hydrogen iodide in the residual hydrogen iodide solution is a concentration at the pseudo-azeotropic point.

* * * * *